UNITED STATES PATENT OFFICE.

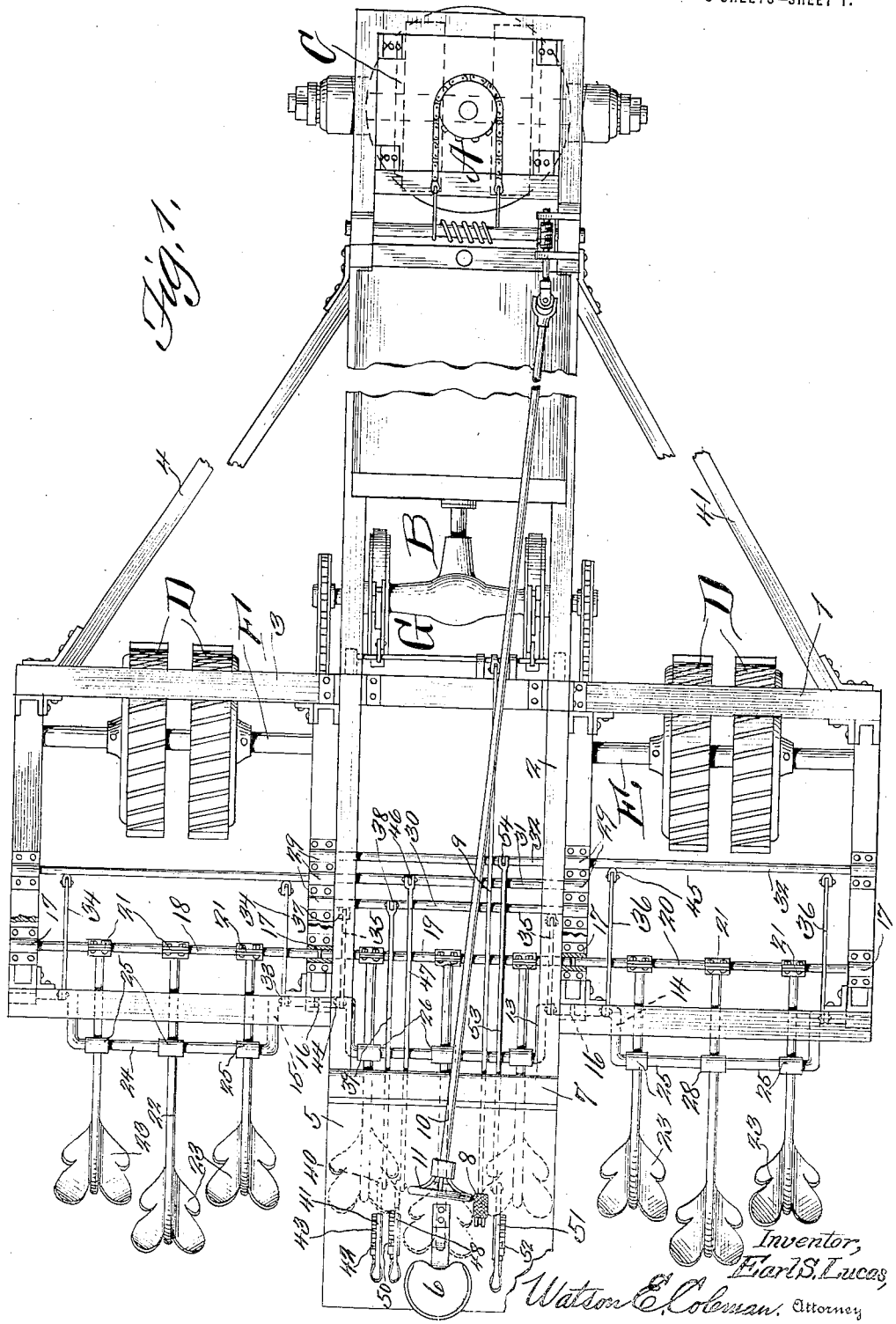

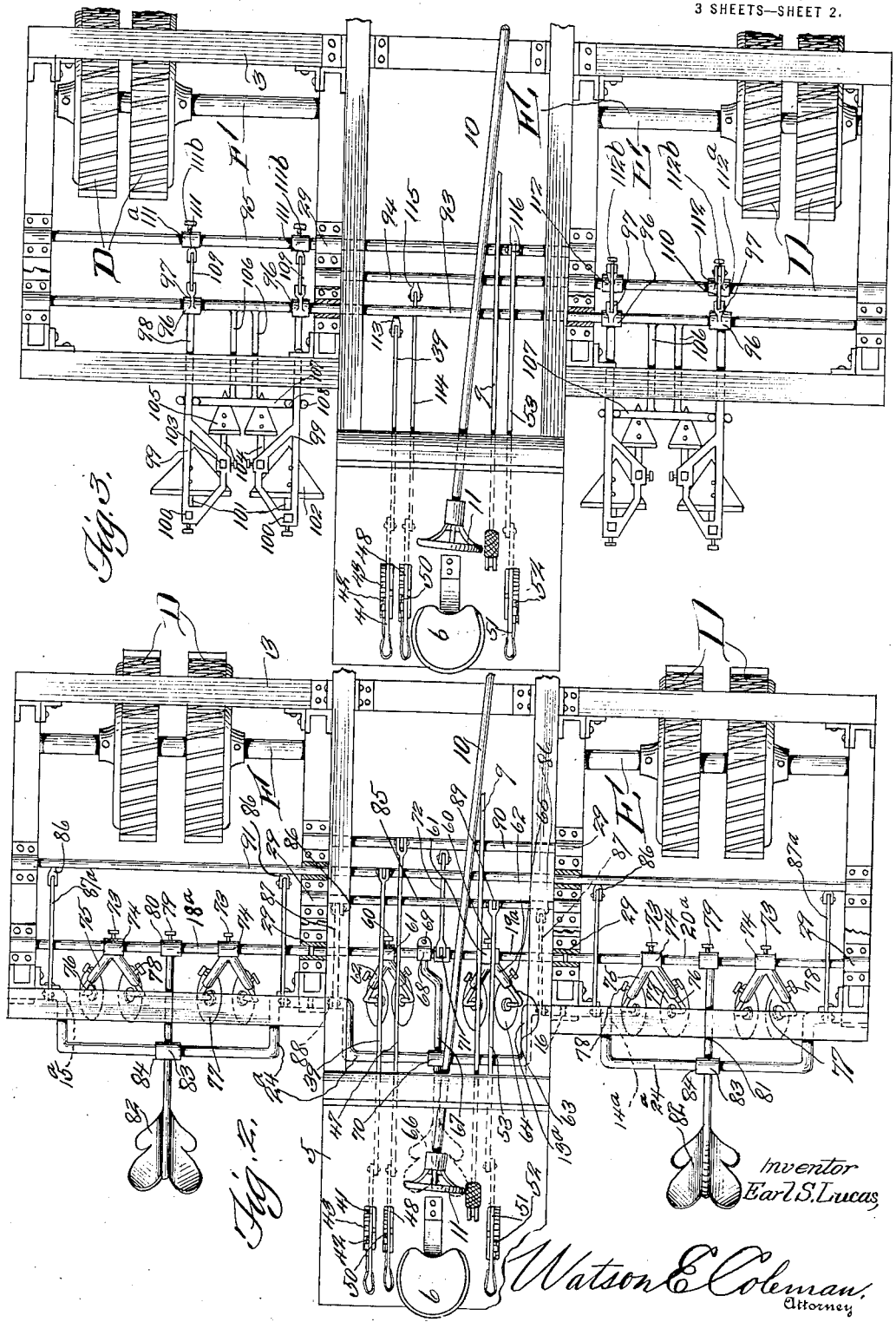

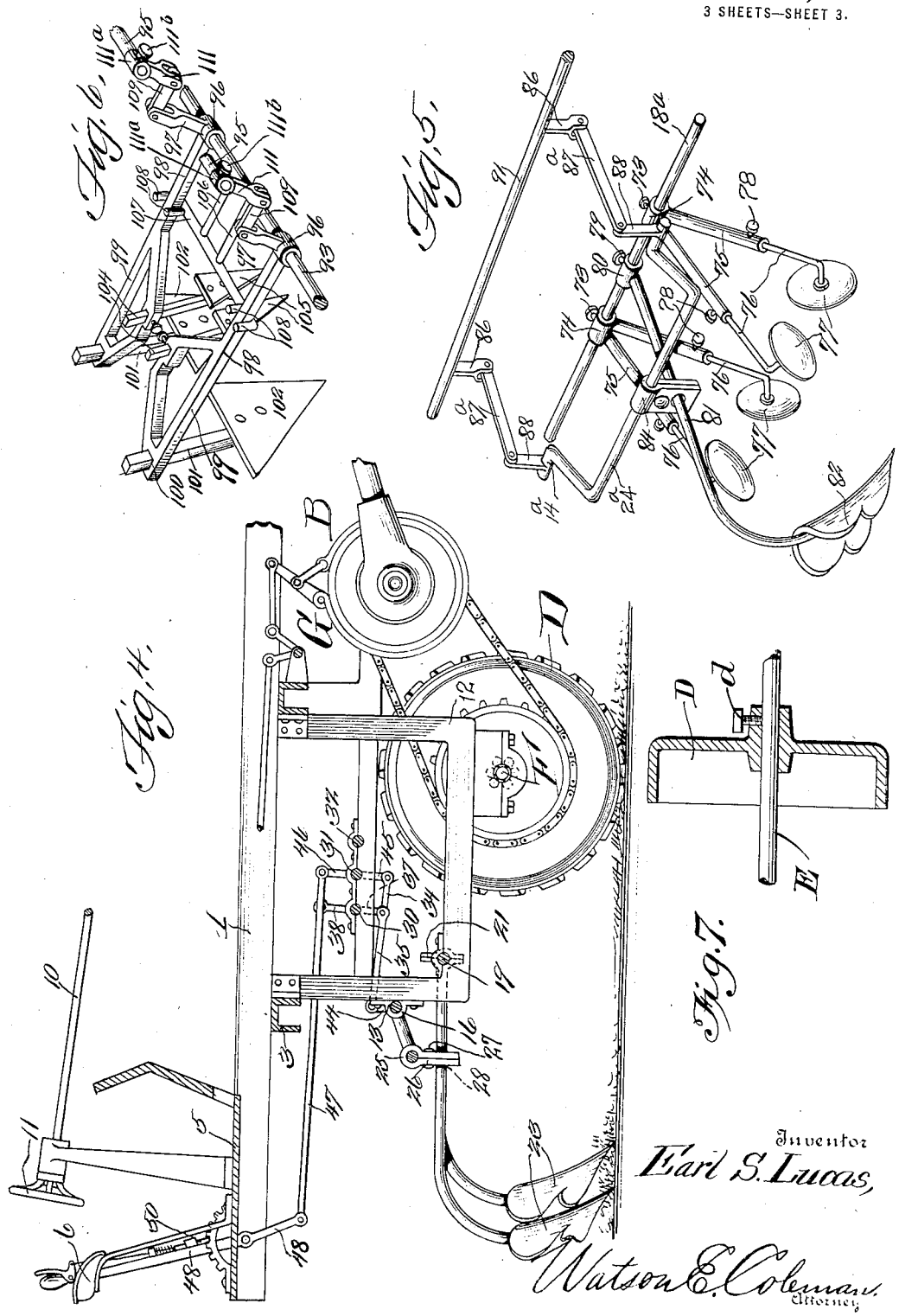

EARL S. LUCAS, OF RANDOLPH, IOWA.

CULTIVATOR.

1,353,924. Specification of Letters Patent. Patented Sept. 28, 1920.

Application filed August 9, 1919. Serial No. 316,363.

*To all whom it may concern:*

Be it known that I, EARL S. LUCAS, a citizen of the United States, residing at Randolph, in the county of Fremont and State of Iowa, have invented certain new and useful Improvements in Cultivators, of which the following is a specification, reference being had to the accompanying drawings.

This invention relates to an improved cultivator and one of the objects of the invention is to provide a cultivator apparatus particularly adapted for use in connection with a motor driven tractor of the type shown, described and claimed in the co-pending application filed in the name of Earl S. Lucas, April 16, 1919, Serial No. 290,454.

A further object of the invention is to provide a cultivator of this kind comprising a tractor frame and a plurality of series of cultivators or shovels, listers, and disks, the series of such implements adapted to be employed alternately for cultivating the soil at the time of planting corn or the like.

For instance, it is an aim of the invention to employ a plurality of series of listers, substantially three, which are designed to operate directly behind the three sets of supporting wheels of the frame for the purpose of lifting the soil at the time of planting the corn or the like.

Furthermore, after accomplishing this result, it is the aim to remove a plurality of series of listers, and substitute in lieu thereof a plurality of disks and shovels, the shovels following the disks in order to accomplish a second plowing or cultivating of the soil. Furthermore, and subsequent to this result, the disks are reversed and the shovels are set out to the center of the ridge, thereby aiming to level the soil.

Subsequent to these results and uses of the shovels, the disks and the listers, it is the further aim to cultivate the soil and to accomplish what may be termed " laying by the corn." This is attained by employing two sets of cultivators, for instance, though not necessarily, four shovels each, which are operable on each side of the front supporting wheels of the apparatus.

Furthermore, it is the aim of the invention to employ a plurality of operating levers, common to the plurality of series of listers, shovels or cultivators and the disks. In other words, the operating levers may be employed to raise or lower the various implements, each series independently, in the first instance, or all of the series or a portion thereof, in the second instance, and in the third instance it is possible to raise or lower one or both series, in order to cultivate the soil deeply or shallow, as may be desired, and if necessary to raise any or all of the series of implements entirely out of engagement with the soil.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of a tractor frame illustrating the conventional form of driving and steering mechanism, such as that shown in the co-pending application, and illustrating a plurality of series of soil listing implements mounted thereon, and means consisting of levers for manipulating the various implements;

Fig. 2 is a plan view of a portion of the tractor frame shown in Fig. 1, but illustrating a modified arrangement of a plurality of series of shovels and disks applied, each series including shovels and disks, and a plurality of levers for raising and lowering all of the shovels together and also the disks or certain of the disks while the shovels remain in their lowered positions;

Fig. 3 is a plan view of a portion of the tractor frame similar to that shown in Fig. 2, illustrating a modified arrangement of a plurality of series of shovels, for instance, four in number applied, whereby all of the series may be raised together or one series independently of the other;

Fig. 4 is a vertical sectional view centrally of Fig. 1 showing the plurality of listers and the means for raising and lowering them;

Fig. 5 is an enlarged detail perspective view of one series of disks including a shovel; and Fig. 6 is a detail perspective view of the series of shovels shown in Fig. 3.

Fig. 7 is a detail sectional view through one of the supporting wheels showing the means for holding the wheel adjustably on the shaft.

Referring more especially to the drawings, 1 designates a conventional form of frame, such as that illustrated in the co-pending application, and which frame is constructed of suitable channel iron. This tractor frame has the usual driving and steering mechanism A and B (which is similar to that in the co-pending application above identified) applied. The frame comprises a longitudinally extending portion 2 and a transversely disposed portion 3, said portions being connected in any suitable manner, such as illustrated, so as to insure rigidity between the longitudinal and transverse portions of the frame. The longitudinal portion of the frame is suitably reinforced by the angularly arranged braces 4.

The steering mechanism A includes the forward steering wheels C and the transversely disposed frame is suitably supported on the rear traction wheels D which are mounted upon the axles E and F. As in the co-pending application herein identified, the supporting traction wheels D are held adjustable on their respective axles E and F by means of the set screw d, according to the cultivating implements to be employed. The rear part of the longitudinal frame has a platform 5, there being a suitable seat 6 mounted thereon in the usual manner. The forward portion of the platform has a dash 7 and also mounted upon the platform is a conventional form of foot lever 8 having a rod connection 9 for controlling the friction brake mechanism of the driving mechanism, such as indicated at G. A standard is mounted upon the platform 5 and in a bearing thereof a connecting rod 10 is mounted and which in turn is connected to the steering mechanism A as illustrated. The rear end of the steering rod 10 has the usual hand wheel 11.

The transversely disposed frame 3 has an auxiliary drop frame 12, and referring more especially to Fig. 1, the rear part of the drop frame has mounted in bearings thereon rocking shafts 13, 14 and 15, the bearings for these shafts being designated by the numeral 16. Also mounted in bearings 17 on a portion of the drop frame is a plurality of shafts 18, 19 and 20, which are axially alined, and secured by suitable clamps 21 to the shafts 18, 19 and 20 are the shanks 22 of the listers 23.

The shafts 13, 14 and 15 have offset or arched portions 24 on which a plurality of sleeves 25 are loosely mounted. These sleeves are split as illustrated and the split portions of the sleeves have flanges or extensions 26 which are bolted together as shown at 27. The flanges or extensions have registering apertures 28 through which the shanks or beams 22 of the listers slidably pass, as the shafts 13, 14 and 15 rock. Also mounted in bearings 29 of parts of the drop frame of the transversely disposed portion of the main frame are shafts 30, 31, and 32. The ends of the shafts 13, 14 and 15 have formed thereon upstanding arms 33, to which the links 34, 35 and 36 are pivotally connected. The shaft 30 is provided with downwardly extending lugs such as indicated at 37, between which the links 35 are connected pivotally. This shaft 30 has an upstanding arm 38, to which a link 39 is pivotally connected. The link 39 is in turn pivotally connected at 40 to an operating lever 41. This operating lever has the usual form of hand grip operated dog 42 to cooperate with the arcuate rack 43 for holding the lever 41 in different adjusted positions. Obviously by manipulating the lever 41 in one direction or the other, the shaft 30 may be rocked which in turn will impart rocking movement to the rocking shaft 13, hence raising and lowering the listers, that is, those centrally disposed of the longitudinal portion of the frame. The links 35 are pivotally connected to upstanding arms 44 of the rocking shaft 13.

The links 34 and 36 are in turn pivotally connected to the downwardly extending forked arms 45 which are carried respectively by the shafts 31 and 32 which are mounted in the bearings 29. The rocking shaft 31 is provided with an upstanding arm 46 to which a link 47 is pivotally connected. The link 47 is in turn connected to an operating lever 48 similar to the operating lever 41 and which is provided with a hand grip operating dog 50. By rocking the lever 48 forwardly or rearwardly, movement will be imparted to the shaft 31 which will transmit movement to the rocking shaft 15, thereby raising the listers on the left of the longitudinal portion of the frame.

An additional operating lever 51 is pivotally mounted upon the platform of the longitudinal frame and carries a hand grip operated dog 52 and the lower end of this lever has connected thereto a link 53, which is pivotally connected to an upstanding arm 54 of the shaft 32. By moving the lever 51 it is obvious that the listers on the right of the longitudinal portion of the frame may be raised or lowered through the medium of the shaft 32 and its connections with the rocking shaft 14. It is obvious that when any one of the series of listers is raised, their shanks or beams will move slidably through the ears or extensions of the sleeves 25 and in which case the sleeves will swivel upon the arched or offset portion 24.

Referring more especially to Fig. 2, it is to be observed that the platform 5 carries the same series of levers 41, 48 and 51. In Fig. 2 a plurality of rocking shafts 13ª, 14ª and 15ª are mounted in bearings 16 and each has an offset or arch portion 24ª.

Mounted in certain of the bearings 29 are shafts 18ª, 19ª and 20ª which are similar to the shafts 18, 19 and 20 and secured upon the shaft 19ª by means of the set screw 60 are the sleeves 61 which have downwardly and rearwardly extending diverging tubular arms 62, which receive the shanks 63 of the disks 64. These disks 64 are arranged in pairs and are capable of being adjusted so that they diverge downwardly or diverge upwardly by adjusting the shanks 63 in the arms 62. When the shanks 63 are so adjusted, the set screws 65 may be tightened to hold the shanks in position.

The shovel or cultivator 66 has its shank or beam 67 connected to the shaft 19ª as by means of the loosely mounted split sleeve 68. The sleeve 68 has a holding bolt or screw 69, not to hold the sleeve fixed, but to prevent the split parts of the sleeve from separating, therefore the sleeve 68 is loose on the shaft 19ª so that the shovel or cultivator can be tilted independently of the disks 64. The arched or offset portion 24ª of the central rock shaft 13ª carries a sleeve 70. This sleeve 70 is split and has downwardly extending lugs or extensions, similar to those carried by the sleeves 25 and bolted together in a similar manner and passing through openings of these lugs or extensions is the shank or beam 67 of the shovel or cultivator 66.

Rising upwardly and movable with the shaft 19ª is an arm 71 to which a link 72 is connected. Secured by set screws 73 to the shafts 20ª and 18ª are sleeves 74, which have downwardly diverging tubular arms 75 to receive the shanks 76 of the disks 77. The shanks 76 of the disks are secured in the tubular arms by the set screws 78. It is obvious that by loosening the set screws 78 the shanks of the disks may be rotated so as to be adjusted in different positions, for instance, the disks may diverge upwardly instead of diverging downwardly as shown.

Also secured by set screws 79 to the shafts 18ª and 20ª are sleeves 80, to which the shanks 81 of the shovels or cultivators 82 are connected. The offset or arched portions 24ª of the shafts 14ª and 15ª have sleeves 83 mounted thereon. These sleeves are split and their split portions have extensions or lugs 84 through which the shanks 81 pass. The lugs or extensions are bolted together, so as to hold the sleeves loosely upon the arched or offset portions 24ª of the shafts 13ª, 14ª and 15ª.

Mounted in certain of the bearings 29 of the drop portion of the frame is a shaft 85 which is provided with downwardly extending spaced arms 86 between which the links 87 are pivotally connected. These links are in turn pivotally connected to the arms 88 of the shaft 13ª.

Referring to Fig. 3, the link 53 is connected to an upstanding arm 89 of the shaft 85 so that when the lever 51 in Fig. 2 is oscillated in one direction or the other, the shaft 85 is rocked which in turn will impart movement to the shaft 13ª. When the shaft 13ª is rocked, the cultivator or shovel 66 will be raised or lowered together with the disks 64 which are carried by the shaft 19ª. By moving the lever 48, movement will be imparted to the shaft 90, which is mounted in certain of the other bearings 29 from which movement will be imparted to the shaft 19ª through the medium of the link 72.

When moving the lever 41 which is connected to the shaft 91 (which also has downwardly extending arms 86 connected to the end shafts 14ª and 15ª by the links 87ª) by the link 39, movement will be imparted to the end shafts 14ª and 15ª, thereby rocking them and raising or lowering the shovels or cultivators 82. When the shovels or cultivators 82 are raised or lowered, the shafts 18ª and 20ª are rocked which in turn will raise the disks 77. The disks 77 may be adjusted longitudinally upon the shafts 18ª and 20ª and furthermore the cultivators or shovels 82 may be likewise adjusted. It is possible to adjust the disks 64 and also the shovel or cultivator 66 transversely of the machine. With the application of the disks and shovels or cultivators shown in Fig. 2, it is possible to reverse the disks and set the shovels out to the center of the ridge to level the soil.

Referring to Fig. 3, shafts 93, 94 and 95 are mounted in the bearings 29 of the drop portion of the frame. The shaft 93 extends entirely transversely of the transverse portion of the main frame, while the shafts 94 and 95 extend two-thirds of the transverse portion of the main frame. The shaft 93 has mounted thereon sleeves 96, provided with forked arms 97. Formed integrally with the sleeves 96 are the shanks 98 of the shovel or cultivator beams or drag bars 99. These beams or drag bars 99 have sockets 100 to receive the shanks 101 of the shovels or cultivators 102. The beams or drag bars 99 have lateral parts which are provided with sockets 103 to receive the shanks 104 of the shovels or cultivators 105.

The cultivators or shovels 102 are arranged in pairs while the shovels or cultivators 105 are smaller than the cultivators 102 and are likewise arranged in pairs, but in between and in advance of the cultivators 102. It is obvious that as these cultivators or shovels travel forwardly in the soil, they thoroughly plow and level the soil.

Formed integral with the shaft 93 are the arms 106 which are connected by means of the transverse rods 107 rising upwardly from which at their opposite ends are the spaced lugs 108. These lugs 108 straddle the shanks 98 of the cultivator or shovel supporting frames, so that as the shaft 93 is rocked as one body, both sets of shovels or cultivators are raised simultaneously. The sleeves 96 are loose upon the shaft 93 and connecting between the forks of the arms 97 of the sleeves 96 are links 109 and 110. The links 109 are connected between the forks of the arms 111 of the shaft 95, while the links 110 are connected between the forks of the arms 112 of the shaft 94.

In order to rock both series of shovels or cultivators simultaneous, the lever 41 may be rocked and through the medium of its link connection 39 with the shaft 93, through the medium of the arm 113, the arms 106 will act to raise all of the shovel or cultivator carrying frames. This is due to the fact that the upstanding lugs 108 straddle the shanks 98. The lever 48, through the medium of its link connection 114 (which is connected between the fork of the arm 115 with the shaft 94) the shaft 94 may be rocked, which in turn will impart movement to the shovel or cultivator carrying frames on the right of the longitudinally extending portion of the main frame, thereby raising the cultivators or shovels on the right independently of the shovels on the left, which remain in their lowermost positions.

In order to raise the shovels on the left, the lever 51 may be oscillated. This lever 51 has its link 53 pivotally connected to the forks of the upstanding arm 116 of the shaft 95, and when this shaft is rocked, movement is imparted to the sleeves 96 on the left hand end portion of the shaft 93 through the medium of the links 109 thereby raising the shovel or cultivator carrying frames 99, that is, those on the left.

In Fig. 3 it will be noted that the rear supporting tractor wheels have been adjusted outwardly upon their supporting axles so that the shovels or cultivators 102 and 105 may operate on each side of the front supporting wheels of the cultivator. The construction shown in Fig. 3 is employed, when it is desired to accomplish what may be termed "laying by corn." In this case the shovels or cultivators are in a series of four.

The arms 111 and 112 are carried by sleeves 111ª and 112ª which are held adjustably on the shafts 95 and 94 by means of the set screws 111ᵇ and 112ᵇ.

Referring to Fig. 1 it will be observed that the implements 23 can be adjusted relative to the shafts 18, 19 and 20 by loosening the bolts of the plates 21 and after the implements have been adjusted in different positions on the shafts, the securing bolts may be retightened. Also any of the implements in Fig. 1 can be removed by removing the clamping plates of the shanks 22 of the implements 23.

Referring to Fig. 2, the set screws 60, the securing or holding bolts 69 and the set bolts 73 and 79 may be loosened so as to slide the sleeves 61 and 68, 74 and 80 adjustably relatively to the shafts thereby permitting the implements to be adjusted and after adjusted the set bolts and screws can be retightened. If desired, by removing the top plates of the bearings of the shafts 18ª, 19ª and 20ª, said shafts can be lifted from their bearings to permit the removal of the sleeves 61, 68, 74 and 80 to allow other implements to be applied such as illustrated in Fig. 1.

Referring to Fig. 3 it will be noted that the sleeves 96 can be adjusted or removed, and when adjusted, the implements will be adjusted on the shafts relatively to the supporting wheels D and when said sleeves 96 are removed, other sleeves or clamping plates carrying the implements can be connected to the shafts. When the implements in Fig. 3 are adjusted as above stated, the sleeves 111ª can also be adjusted by loosening the set screws 111ᵇ. The supporting wheels D in Figs. 2 and 3 can be adjusted relatively to their axles as herein previously stated, therefore the implements are capable of adjustment relatively to the axles and vice versa.

The invention having been set forth, what is claimed as new and useful is:—

1. In a cultivator, a frame, forward and rear supporting wheels therefor, the rear wheels being adjustable laterally, a plurality of soil working implements, shafting on which said implements are adjustable relatively to the rear supporting wheels, whereby the implements may be positioned to the rear of the rear supporting wheels, or upon either side of the forward supporting wheels, and swingingly mounted means for raising and lowering said implements.

2. In a cultivator, a frame having a drop portion, supporting wheels therefor, a shaft mounted in said drop portion, soil working implement carrying frames pivotally mounted on the shaft, soil working implements mounted in bearings of said frames, certain of said implements being in advance of and between certain of the other implements, means for rocking the shaft, and means carried by the shaft and having engagement with said soil working implement carrying frames, whereby as the shaft is rocked all of the frames are raised or lowered simultaneously.

3. In a cultivator, a frame having a drop portion, supporting wheels therefor, a shaft mounted in said drop portion, soil working implement carrying frames pivotally mounted on the shaft, soil working implements mounted in bearings of said frames, certain of said implements being in advance of and between certain of the other implements, means for rocking the shaft, means carried by the shaft and having engagement with said soil working implement carrying frames, whereby as the shaft is rocked all of the frames are raised or lowered simultaneously, and means connected to the soil working implement carrying frames, whereby certain of said implement carrying frames may be raised and lowered independently of other implement carrying frames.

4. In a cultivator, a frame having a drop portion, supporting wheels therefor, a shaft mounted in said drop portion, soil working implement carrying frames pivotally mounted on the shaft, soil working implements mounted in bearings of said frames, certain of said implements being in advance of and between certain of the other implements, means for rocking the shaft, means carried by the shaft and having engagement with said soil working implement carrying frames, whereby as the shaft is rocked all of the frames are raised or lowered simultaneously, and means connected to the soil working implement carrying frames whereby certain of said implement carrying frames may be raised and lowered independently of other implement carrying frames, said implement carrying frames being adjustable axially on the shaft, whereby they may be adjusted relatively to the supporting wheels.

In testimony whereof I hereunto affix my signature.

EARL S. LUCAS.